United States Patent [19]

Conrow et al.

[11] 4,062,837
[45] Dec. 13, 1977

[54] DISAZO COMPOUNDS USEFUL AS COMPLEMENT INHIBITORS

[75] Inventors: Ransom Brown Conrow, Pearl River; Seymour Bernstein, New City; Norman Bauman, Nanuet, all of N.Y.

[73] Assignee: American Cyanamid Company, Stamford, Conn.

[21] Appl. No.: 640,098

[22] Filed: Dec. 12, 1975

[51] Int. Cl.$^2$ .......................................... C07C 107/04
[52] U.S. Cl. ..................................... 260/175; 424/226
[58] Field of Search ........................ 260/175; 424/226

[56] References Cited

U.S. PATENT DOCUMENTS 430,533  6/1890  Muller ................................. 260/175

OTHER PUBLICATIONS

Pauglo et al., *Zh. Nauchn. i Prikl. Fotogr. i Kinemator,* 10 (5), 360–365, (1965).
Lambert et al., *Brit. J. Exptl. Path.,* vol. 33, pp. 327–329, 1952.
*Colour Index,* 3rd Ed., vol. 4, p. 4221, CI. 25375, CI. 25380.

*Primary Examiner*—Charles F. Warren
*Attorney, Agent, or Firm*—Jack W. Richards

[57]  ABSTRACT

5,5′-[ureylenebis(1,4-phenyleneazo)]bis[aminonaphthalenedisulfonic acids] and salts useful as complement inhibitors.

3 Claims, No Drawings

DISAZO COMPOUNDS USEFUL AS COMPLEMENT INHIBITORS

BACKGROUND OF THE INVENTION

The present invention resides in the concept of certain 5,5'-[ureylenebis(1,4-phenyleneazo]bis[6,7 or 8-amino-1,2,3 or 4-naphthalenedisulfonic acids] and salts and their use as inhibitors of the complement system of warm-blooded animals.

The term "complement" refers to a complex group of proteins in body fluids that, working together with antibodies or other factors, play an important role as mediators of immune, allergic, immunochemical and/or immunopathological reactions. The reactions in which complement participates takes place in blood serum or in other body fluids, and hence are considered to be humoral reactions.

With regard to human blood, there are at present more than 11 proteins in the complement system. These complement proteins are designated by the letter C and by number: C1, C2, C3 and so on up to C9. The complement protein C1 is actually an assembly of subunits designated C1q, C1r and C1s. The numbers assigned to the complement proteins reflect the sequence in which they become active, with the exception of complement protein C4, which reacts after C1 and before C2. The numerial assignments for the proteins in the complement system were made before the reaction sequence was fully understood. A more detailed discussion of the complement system and its role in body processes can be found in, for example, *Bull. World Health Org.*, 39 935–938 (1968); *Scientific American*, 229, (No. 5), 54–66 (1973); *Medical World News*, Oct. 11, 1974 pp. 53–58; 64–66; *Harvey Lectures*, 66, 75–104 (1972); *The New England Journal of Medicine* 287, 489–495; 545–549; 592–596; 642–646 (1972); *The Johns Hopkins Med. J.* 128, 57–74 (1971); and *Federation Proceedings*, 32, 134–137 (1973).

The complement system can be considered to consist of three sub-systems: (1) a recognition unit (C1q) which enables it to combine with antibody molecules that have detected a foreign invader; (2) an activation unit (C1r, C1s, C2, C4, C3), which prepares a site on the neighboring membrane; and (3) an attack unit (C5, C6, C7, C8 and C9) which creates a "hole" in the membrane. The membrane attack unit is non-specific; it destroys invaders only because it is generated in their neighborhood. In order to minimize damage to the host's own cells, its activity must be limited in time. This limitation is accomplished partly by the spontaneous decay of activated complement and partly by interference by inhibitors and destructive enzymes. The control of complement, however, is not perfect and there are times when damage is done to the host's cells. Immunity is therefore a double-edged sword.

Activation of the complement system also accelerates blood clotting. This action comes about by way of the complement-mediated release of a clotting factor from platelets. The biologically active complement fragments and complexes can become involved in reactions that damage the host's cells, and these pathogenic reactions can result in the development of immune-complex diseases. For example, in some forms of nephritis complement damages the basal membrane of the kidney, resulting in the escape of protein from the blood into the urine. The disease disseminated lupus erythematosus belongs in this category; its symptoms include nephritis, visceral lesions and skin eruptions. The treatment of diphtheria or tetanus with the injection of large amounts of antitoxin sometimes results in serum sickness, an immune-complex disease. Rheumatoid arthritis also involves immune complexes. Like disseminated lupus erythematosus, it is an autoimmune disease, in which the disease symptoms are caused by pathological effects of the immune system in the host's tissues. In summary, the complement system has been shown to be involved with inflamation, coagulation, fibrinolysis, antibody-antigen reactions and other metabolic processes.

In the presence of antibody-antigen complexes the complement proteins are involved in a series of reactions which may lead to irreversible membrane damage if they occur in the vicinity of biological membranes. Thus, while complement constitutes a part of the body's defense mechanism against infection, it also results in inflammation and tissue damage in the immunopathological process. The nature of certain of the complement proteins, suggestions regarding the mode of complement binding to biological membranes and the manner in which complement effects membrane damage are discussed in *Annual Review of Biochemistry*, 38, 389 (1969).

A variety of substances have been disclosed as inhibiting the complement system, i.e., as complement inhibitors. For example, the compounds 3,3'-ureylenebis[6-(2-amino-8-hydroxy-6-sulfo-1-naphthylazo)]benzenesulfonic acid tetrasodium salt (chlorazol fast pink), heparin and a sulphated dextran have been reported to have an anticomplementary effect, *British Journal of Experimental Pathology*, 33, 327–339 (1952). The compound 8,8'-[ureylenebis[m-phenylenecarbonylimino(4-methyl-m-phenylenecarbonyl)imino]]di-1,3,5-naphthalenetrisulfonic acid, hexasodium salt (Suramin Sodium) is described as a competitive inhibitor of the complement system, *Clin. Exp. Immunol.*, 10, 127–138 (1972). German Pat. No. 2,254,893 or South African Pat. No. 72 07 923 disclosed certain 1-(diphenylmethyl)-4-(3-phenylallyl)piperazines useful as complement inhibitors. Other chemical compounds having complement inhibiting activity are disclosed in, for example, *Journal of Medicinal Chemistry*, 12, 415–419, 902–905, 1049–1052, 1053–1056 (1969); *Canadian Journal of Biochemistry*, 47, 547–552 (1969); *The Journal of Immunology*, 93, 629–640 (1964); *The Journal of Immunology*, 104, 279–288 (1970); *The Journal of Immunology*, 106, 241–245 (1971); and *The Journal of Immunology*, 111, 1061–1066 (1973).

It has been reported that the known complement inhibitors epsilon-aminocapronic acid, Suramin Sodium and tranexamic acid have been used with success in the treatment of hereditary angioneurotic edema, a disease state resulting from an inherited deficiency or lack of function of the serum inhibitor of the activated first component of complement (C1 inhibitor), *The New England Journal of Medicine*, 286, 808–812 (1972); *Allergol. Et. Immunopath*, II, 163–168 (1974); and *J. Allergy Clin. Immunol.*, 53, No. 5, 298–302 (1974).

SUMMARY OF THE INVENTION

It has now been discovered that a representative 5,5'-[ureylenebis(1,4-phenyleneazo)]bis[6,7, or 8 amino-1,2,3 or 4-naphthalenesulfonic acid] salt interacts with the complement reaction sequence, thereby inhibiting complement activity in body fluids.

This invention is particularly concerned with 5,5'-[ureylenebis(1,4-phenyleneazo)]bis[6,7 or 8-amino-1,2,3 or 4-naphthalenedisulfonic acids] and salts of the general formula (I):

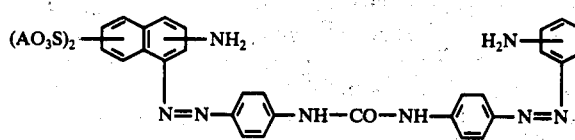

wherein A is H, Na (sodium) or K (potassium), with the proviso that each A is identical in the same compound. The designation $(AO_3S-)_2$ refers to two $(AO_3S-)$ groups, one each at either the 1, 2, 3 or 4-position of the naphthalene ring.

Of particular interest within the above general formula (I) are the group of compounds wherein A is Na and, within this group, the compound of most interest is 5,5'-[ureylenebis(1,4-phenyleneazo)]bis[6-amino-1,3-naphthalenedisulfonic acid] tetrasodium salt of the formula

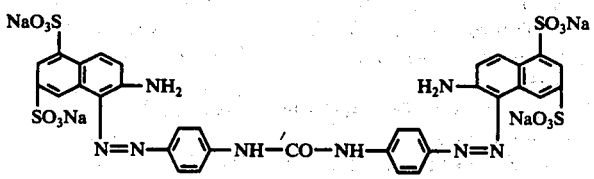

Representative salts encompassed within the invention include, for example, the salt of the formula:

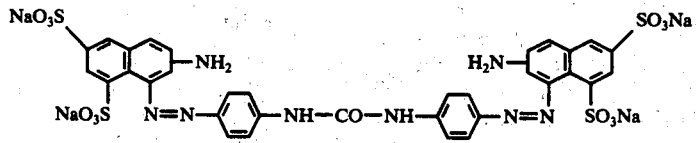

A compound related to those of the present invention, and disclosed as having anticomplementary effect, is the compound 3,3'-ureylenebis[6-(2-amino-8-hydroxy-6-sulfo-1-naphthylazo)benzenesulfonic acid] tetrasodium salt (chlorazol fast pink), *British Journal of Experimental Pathology*, 33, 327–339 (1952).

The compounds of the invention represented by Formula I may be synthesized as follows: The appropriate 6-aminonaphthelenedisulfonic acid is treated with diazotized p-nitroaniline. The resulting 6-amino-5-(p-nitrophenylazo)naphthalenedisulfonic acid disodium salt is reduced to provide the corresponding p-aminophenylazo compound. Treatment of the latter with phosgene gives the ureide compounds. Acidification provides the free sulfonic acids.

This invention is also concerned with a method of inhibiting the complement system in a body fluid, such as blood serum, which comprised subjecting body fluid complement to the action of an effective complement inhibiting amount of a compound encompassed with formula (I) hereinabove. The method of use aspect of this invention is also concerned with a method of inhibiting the complement system in a warm-blooded animal which comprises internally administering to said animal an effective complement inhibiting amount of a compound encompassed within formula (I) hereinabove. Body fluid can include blood, plasma, serum, synovial fluid, cerebrospinal fluid, or pathological accumulations of fluids such as pleural effusion, etc.

The compounds of the present invention find utility as complement inhibitors in body fluids and as such may be used to ameliorate or prevent those pathological reactions requiring the function of complement and in the therapeutic treatment of warm-blooded animals having immunologic diseases such as rheumatoid arthritis, systemic lupus erythematosus, certain kinds of glomerulonephritis, certain kinds of autoallergic hemolytic anemia, certain kinds of platelet disorders and certain kinds of vasculitis. The compounds herein may also be used in the therapeutic treatment of warm-blooded animals having non-immunologic diseases such as paroxysmal nocturnal hemoglobinuria, hereditary angioneurotic edema (treated with Suramin Sodium, etc.) and inflammatory states induced by the action of bacterial of lysosomal enzymes on the appropriate complement components as, for example, inflammation following coronary occlusion. They may also be useful in the treatment of transplant rejection.

DETAILED DESCRIPTION OF THE INVENTION

The following examples will serve to illustrate the invention in more detail.

EXAMPLE 1

5,5'-[Ureylenebis(1,4-phenyleneazo)]bis[6-amino-1,3-naphthalenedisulfonic acid], tetrasodium salt A solution of 11.6 g of p-nitroaniline in 85 ml of water, 70 ml of acetic acid and 21 ml of concentrated hydrochloric acid is cooled at −3° C in an ice-salt bath. To it is added a solution of 5.8 g of sodium nitrite in 10 ml of water.

The mixture is stirred for approximately 15 minutes then 23.8 g of sodium acetate trihydrate is added followed by a solution of 27.5 g of 92.5% 6-amino-1,3-naphthalenedisulfonic acid in 33.6 ml of 5N sodium hydroxide and 10 ml of water. A 50 ml portion of water is added to the resulting thick paste, the mixture is heated until it is in solution, then is filtered. The filtrate is cooled to room temperature and the product is crystallized out. The mixture is filtered and the product is washed with a 100 ml portion of a 20% aqueous solution of sodium acetate trihydrate, then with ethanol and ether. The product is dried overnight at elevated temperature and reduced pressure over a drying agent. THe resulting brown powder is 6-amino-5-(p-nitrophenylazo)-1,3-naphthalenedisulfonic acid, disodium salt.

A solution of 28.95 g of the above product and 25.0 g of sodium sulfide nonahydrate in 450 ml of water is heated on a steam bath at 75°-85° C for 15 minutes. The solution is cooled and 21.0 ml of acetic acid is added. The mixture is warmed to 70° C and is filtered. To the filtrate is added 50 g of sodium acetate trihydrate, the mixture is cooled to 15°-20° C and filtered. The product is washed with a 15% aqueous solution of sodium acetate trihydrate and then with ethanol and ether. This material is then dried to give 6-amino-5-(p-aminophenylazo)-1,3-naphthalenedisulfonic acid, disodium salt.

Phosgene is passed into a slightly warm solution of 10.0 of the preceding product and 7.15 g of anhydrous sodium carbonate in 150 ml of water until electrophoresis indicates that the reaction is complete. The excess carbonate is neutralized with acetic acid, the mixture is heated to near boiling and 10.0 g of sodium acetate trihydrate is added portionwise. The solution is allowed to cool to room temperature and is filtered. The product is washed with a 15% aqueous solution of sodium acetate trihydrate. THe resulting paste is stirred in ethanol, the product is filtered, washed thoroughly with ethanol and ether, then is dried over a drying agent under reduced pressure and elevated temperature to give 5,5'-[ureylenebis(1,4-phenyleneazo)]bis[6-amino-1,3-naphthalenedisulfonic acid], tetrasodium salt.

EXAMPLE 2

Preparation of Compressed Tablet

| | mg./tablet |
|---|---|
| 5,5'-[Ureylenebis(1,4-phenyleneazo)]bis[6-amino-1,3-naphthalenedisulfonic acid], tetrasodium salt | 0.5 – 500 |
| Dibasic Calcium Phosphate NF | qs |
| Starch USP | 40 |
| Modified Starch | 10 |
| Magnesium Stearate USP | 1 – 5 |

EXAMPLE 3

Preparation of Compressed Tablet-Sustained Action

| | mg./tablet |
|---|---|
| 5,5'-[Ureylenebis(1,4-phenyleneazo)]bis[6-amino-1,3-naphthalenedisulfonic acid], tetrasodium salt as aluminum lake*, micronized | 0.5 – 500 as acid equivalent |
| Dibasic Calcium Phosphate NF | qs |
| Alginic Acid | 20 |
| Starch USP | 35 |
| Magnesium Stearate USP | 1 – 10 |

*Complement inhibitor plus aluminum sulfate yields aluminum complement inhibitor. Complement inhibitor content in aluminum lake ranges from 5 – 30%.

EXAMPLE 4

Preparation of Hard Shell Capsule

| | mg./capsule |
|---|---|
| 5,5'-[Ureylenebis(1,4-phenyleneazo)]bis[6-amino-1,3-naphthalenedisulfonic acid], tetrasodium salt | 0.5 – 500 |
| Lactose, Spray Dried | qs |

-continued
Preparation of Hard Shell Capsule

| | mg./capsule |
|---|---|
| Magnesium Stearate | 1 – 10 |

EXAMPLE 5

Preparation of Oral Liquid (Syrup)

| | % w/v |
|---|---|
| 5,5'-[Ureylenebis(1,4-phenyleneazo)]bis[6-amino-1,3-naphthalenedisulfonic acid], tetrasodium salt | 0.05 – 5 |
| Liquid Sugar | 75.0 |
| Methyl Paraben USP | 0.18 |
| Propyl Paraben USP | 0.02 |
| Flavoring Agent | qs |
| Purified Water qs ad | 100.0 |

EXAMPLE 6

Preparation of Oral Liquid (Elixir)

| | % w/v |
|---|---|
| 5,5'-[Ureylenebis(1,4-phenyleneazo)]bis[6-amino-1,3-naphthalenedisulfonic acid], tetrasodium salt | 0.05 – 5 |
| Alcohol USP | 12.5 |
| Glycerin USP | 45.0 |
| Syrup USP | 20.0 |
| Flavoring Agent | qs |
| Purified Water qs ad | 100.0 |

EXAMPLE 7

Preparation of Oral Suspension (Syrup)

| | % w/v |
|---|---|
| 5,5'-[Ureylenebis(1,4-phenyleneazo)]bis[6-amino-1,3-naphthalenedisulfonic acid] tetrasodium salt as aluminum lake, micronized | 0.05 – 5 (acid equivalent) |
| Polysorbate 80 USP | 0.1 |
| Magnesium Aluminum Silicate, Colloidal | 0.3 |
| Flavoring Agent | qs |
| Methyl Paraben USP | 0.18 |
| Propyl Paraben USP | 0.02 |
| Liquid Sugar | 75.0 |
| Purified Water qs ad | 100.0 |

EXAMPLE 8

Preparation of Injectable Solution

| | % w/v |
|---|---|
| 5,5'-[Ureylenebis(1,4-phenyleneazo)]bis[6-amino-1,3-naphthalenedisulfonic acid], tetrasodium salt | 0.05 – 5 |
| Benzyl Alcohol NF | 0.09 |
| Water for Injection | 100.0 |

EXAMPLE 9

Preparation of Injectable Oil

| | % w/v |
|---|---|
| 5,5'-[Ureylenebis(1,4-phenyleneazo)]bis[6-amino-1,3-naphthalenedisulfonic acid], tetrasodium salt | 0.05 – 5 |
| Benzyl Alcohol | 1.5 |

| -continued | |
| --- | --- |
| Preparation of Injectable Oil | |
| | % w/v |
| Sesame Oil qs ad | 100.0 |

EXAMPLE 10

| Preparation of Injectable Depo Suspension | |
| --- | --- |
| | % w/v |
| 5,5'-[Ureylenebis(1,4-phenyleneazo)]bis[6-amino-1,3-naphthalenedisulfonic acid], tetrasodium salt as aluminum lake, micronized | 0.05 – 5 (acid equivalent) |
| Polysorbate 80 USP | 0.2 |
| Polyethylene Glycol 4000 USP | 3.0 |
| Sodium Chloride USP | 0.8 |
| Benzyl Alcohol N.F. | 0.9 |
| HCl to pH 6 – 8 | qs |
| Water for Injection qs ad | 100.0 |

The compounds of this invention may be administered internally, e.g., orally or parenterally, such as intra-articularly, to a warm-blooded animal to inhibit complement in the body fluid of the animal, such inhibition being useful in the amelioration or prevention of those reactions dependent upon the function of complement, such as inflammatory process and cell membrane damage induced by antigen-antibody complexes. A range of doses may be employed depending on the mode of administration, the condition being treated and the particular compound being used. For example, for intravenous or subcutaneous use from about 5 to about 50 mg./kg./day, or every 6 hours for more rapidly excreted salts, may be used. For inta-articular use for large joints such as the knee, from about 2 to about 20 mg./joint per week may be used, with proportionally similar doses for smaller joints. The dosage range is to be adjusted to provide optimum therapeutic response in the warm-blooded animal being treated. In general, the amount of salt administered can vary over a wide range to provide from about 5 mg./kg, to about 100 mg./kg. of body weight of animal per day. The usual daily dosage for a 70 kg. subject may vary from about 350 mg. to about 3.5 g. Unit doses of the salt can contain from about 0.5 mg. to about 500 mg.

In therapeutic use the compounds of this invention may be administered in the form of conventional pharmaceutical compositions. Such compositions may be formulated so as to be suitable for oral or parenteral administration. The active ingredient may be combined in admixture with a pharmaceutically acceptable carrier, which carrier may take a wide variety for forms depending on the form of preparation desired for administration, i.e., oral or parenteral. The compounds can be used in compositions such as tablets. Here, the principal active ingredient is mixed with conventional tabletting ingredients such as corn starch, lactose, sucrose, sorbitol, talc, stearic acid, magnesium stearate, dicalcium phosphate, gums, or similar materials as non-toxic pharmaceutically acceptable diluents or carriers. The tablets or pills of the novel compositions can be laminated or otherwise compounded to provide a dosage for affording the advantage of prolonged or delayed action of predetermined successive action of the enclosed medication. For example, the tablet or pill can comprise an inner dosage, an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, and cetyl alcohol, cellulose acetate and the like. A particularly advantageous enteric coating comprises a styrene maleic acid copolymer together with known materials contributing to the enteric properties of the coatings. The tablet or pill may be colored through the use of an appropriate non-toxic dye, so as to provide a pleasing appearance.

The liquid forms in which the novel compositions of the present invention may be incorporated for administration include suitable flavored emulsions with edible oils, such as, cottonseed oil, sesame oil, coconut oil, peanut oil, and the like, as well as elexirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powders, packets, granules, wafers, cachets, teaspoonfuls, dropperfuls, ampules, vials, segregated multiples of any of the foregoing and other forms as herein described.

The complement inhibiting activity of a representative compound of this invention has been demonstrated by one or more of the following identified tests: (i) Test, Code 026 (C1 inhibitor). This test measures the ability of activated human C1 to destroy fluid phase human C2 in the presence of C4 and appropriate dilutions of the test compound. An active inhibitor protects C2 from C1 and C4; (ii) Test, Code 35 1 (C3–C9 inhibitor) — This test determines the ability of the late components of human complement (C3–C9) to lyse EAC 142 in the presence of appropriate dilutions of the test compound. An active inhibitor protects EAC 142 from lysis by human C3–C9; (iii) Test, Code 036 (C-Shunt inhibitor) — In the test human erythrocytes rendered fragile are lysed in autologous serum via the shunt pathway activated by cobra venom factor in the presence of appropriate dilutions of the test compound. Inhibition of the shunt pathway results in failure to lysis; (iv) Forssman Vasculitis Test — Here, the well known complement dependent lesion, Forssman vasculitis, is produced in guinea pigs by intradermal injection of rabbit anti-Forssman antiserum. The lesion is measured in terms of diameter, edema and hemmorrhage and the extent to which a combined index of these is inhibited by prior intrapertioneal injection of the test compound at 200 mg./kg. is then reported, unless otherwise stated; (v) Forssman Shock Test — Lethal shock is produced in guinea pigs by an i.v. injection of anti-Forssman antiserum and the harmonic mean death time of treated guinea pigs is compared with that of simultaneous controls; (v) Complement Level Reduction Test — In this test, the above dosed guinea pigs, or others, are bled for serum and the complement level is determined in undiluted serum by the capillary tube method of U.S. Pat. No. 3,876,376 and compared to undosed control guinea pigs; and (vii) Cap 50 Test — Here, appropriate amounts of the test compound are added to a pool of guinea pig serum in vitro, after which the undiluted serum capillary tube assay referred to above is run. THe concentration of compound inhibiting 50% is reported.

Table I shows the anti-complement activity of the principal compound of the invention.

TABLE I

| Compound | Biological Activities | | | |
|---|---|---|---|---|
| | Assay Results | | | |
| | In Vitro | | In Vivo | |
| | 026* | 035 | Forssman | % Reduction Complement |
| 5,5'-[Ureylenebis (1,4-phenyleneazo) [6-amino-1,3-naphalene- | +4** | +4 | 59 | 50 |

TABLE I-continued

| Compound | Biological Activities | | | |
|---|---|---|---|---|
| | Assay Results | | | |
| | In Vitro | | In Vivo | |
| | 026* | 035 | Forssman | % Reduction Complement |
| disulfonic acid], tetrasodium salt | | | | |

*Tests identified by code herein.
**4 = Activity 4 wells, a serial dilution assay; higher well number indicates higher activity. The serial dilutions are two-fold.

We claim:
1. A compound selected from those of the formula:

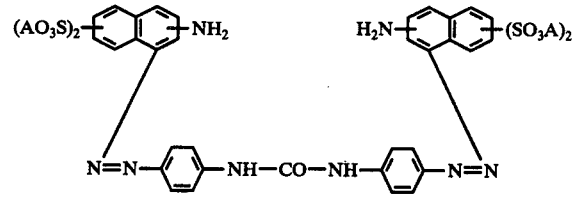

wherein A is H, Na or K, with the proviso that each A is identical in the same compound.

2. A compound selected from those of the formula:

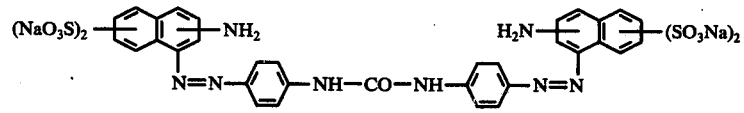

3. A compound according to claim 2 of the formula:

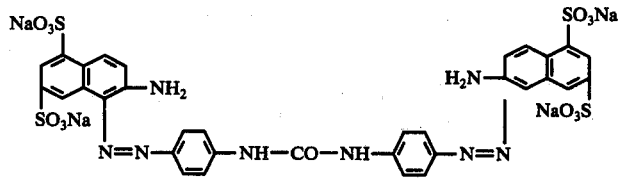

* * * * *